March 7, 1967 — C. T. SCHEINDEL — 3,307,738
LAMINATED COLLAPSIBLE TUBE
Filed May 22, 1964

INVENTOR.
CHRISTIAN THEODORE SCHEINDEL
BY
Louis F. Heeb
ATTORNEY

United States Patent Office 3,307,738
Patented Mar. 7, 1967

3,307,738
LAMINATED COLLAPSIBLE TUBE
Christian Theodore Scheindel, Glen Gardner, N.J., assignor to American Can Company, a corporation of New Jersey
Filed May 22, 1964, Ser. No. 369,498
4 Claims. (Cl. 220—83)

This invention relates to containers of the type known as squeeze-to-use collapsible tubes and is particularly directed to a collapsible tube having a laminated body with a special side seam construction.

Collapsible tubes of laminated construction are well known in the art. Generally, the known constructions all seek to accomplish the economic and use advantages of thin plastic layers combined with additional layers of different materials, including one or more barrier layers. However, none of these constructions have been perfected to the point of being commercially practicable.

An object of the present invention is to provide a laminated collapsible tube of novel and low cost construction.

Another object of this invention is to provide a laminated collapsible tube having a novel side seam construction.

Still another object of this invention is to provide a laminated collapsible tube that readily lends itself to economical high speed fabrication techniques.

The accomplishment of these objects is achieved by a construction of a collapsible tube comprising a headpiece integrally united to a preformed tubular laminated body, which body includes a barrier layer, such as metallic foil, and at least an inner thermoplastic layer substantially coextensively bonded together. The longitudinal edges of the layers are overlapped in shaping the body and fused together under heat and pressure to form a side seam of a predetermined arcuate width and curvature and of a thickness substantially less than the combined thickness of the lapped edges prior to being fused together.

These and other objects and advantages of this invention will become apparent from the following description which, taken in connection with the accompanying drawings and appended claims, disclose a preferred embodiment thereof.

Referring to the drawings.

Figure 1:
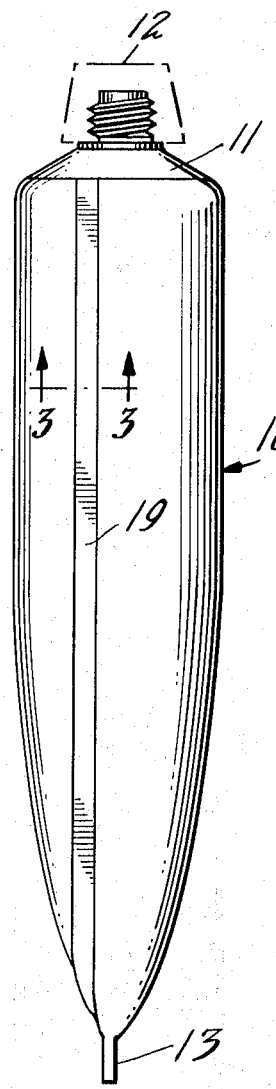
FIGURE 1 is a side elevational view of a collapsible tube incorporating the novel features of this invention.

The collapsible tube illustrated in FIGURE 1 comprises a laminated tubular body generally designated 10, to one end of which is integrally united a threaded headpiece 11 adapted to receive a screw cap 12. The headpiece may be of any desired configuration and may be united to the body 10 in any desirable manner. Preferably, the headpiece is of a thermoplastic material and is formed and fused to the body in the manner taught by United States Patent 2,673,374 to Andre Strahm.

Collapsible tubes of this type customarily are formed and capped by the tube manufacturer and shipped to the packer with the bottom end open. After being filled through the bottom end with a product, the tube is sealed with a transverse bottom end seal, such as at 13.

The body 10 is of laminated construction comprising several distinct layers bonded together. Preferably, the body is formed from a flat web or blank which has been fabricated in a preliminary operation, an example of which is one wherein one or more thermoplastic films are extruded directly onto and bonded to opposite sides of an endless intermediate substrate. By way of illustration and not limitation, body 10 is shown made up of an inner thermoplastic layer 14, an outer thermoplastic layer 15 and an intermediate barrier layer 16 of metallic foil, all coextensively bonded together. Additional layers may be used, including intermediate layers of paper and/or special bonding thermoplastic adhesives formulated to provide good adherence of the thermoplastic layers 14 and 15 to the foil layer 16.

Figure 2:
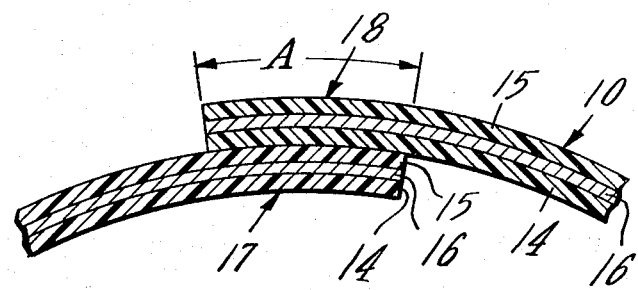
FIGURE 2 is an enlarged sectional view depicting the lapped edges of the tube body prior to forming the side seam.

In forming the body 10, the flat body web or blank is folded over a cylindrical forming member of suitable construction so that the opposite longitudinal edges of the blank overlap a predetermined arcuate distance A (FIGURE 2). Thereafter, these lapped edges, designated inner lap 17 and outer lap 18, are pressed together under heat and pressure and fused together to form a longitudinal side seam 19 extending the full length of body 10.

Figure 3:
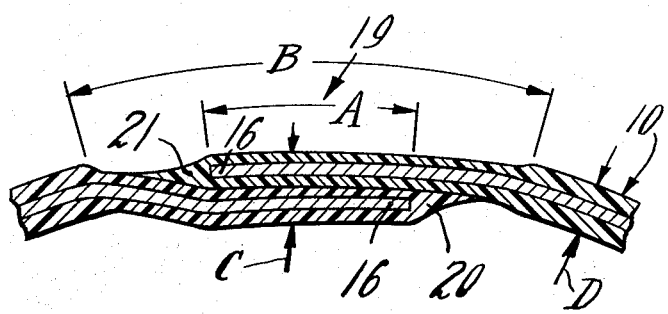
FIGURE 3 is an enlarged sectional view taken substantially along lines 3—3 of FIGURE 1, showing the side seam construction.

The construction of this side seam 19 as it appears in cross section is illustrated in FIGURE 3. In practice, this seam is formed by applying heat and uniform pressure over an area of arcuate width B extending beyond each edge of the inner and outer laps 17 and 18 which define the dimension A, for a purpose soon to be explained.

The combined effect of heat and pressure causes the thermoplastic layers 14 and 15 on each of the laps 17 and 18 to be compressed and partially squeezed out of or circumferentially away from the region represented by dimension A. Preferably, the heat and pressure applied is such as to cause a reduction in the thicknesses of these layers so that the resulting thickness C of side seam 19 is about 1.4 to 1.5 times the normal thickness D of the body wall; i.e. approximately 75% of the thickness of the laps 17 and 18 before seaming. A portion of the squeezed-out heat-softened thermoplastic from these layers flows out and over the edge of the barrier layer 16 in each lap and fuses together to form fillets of coalesced thermoplastic enclosing the respective edges of the barrier layer, as indicated by the numerals 20 and 21. These fillets not only join together over the edges of the barrier layer 16 the respective inner and outer thermoplastic layers 14 and 15 in the inner and outer laps, but each fillet also is pressed into and fused with the corresponding thermoplastic layer of the other lap by reason of the fact that the sealing heat and pressure is applied over the width B rather than just A. That is, fillet 20 is caused to fuse with the overlying region of inner thermoplastic layer 14 adjacent the edge of inner lap 17, and fillet 21 is caused to fuse with a corresponding underlying region of outer thermoplastic layer 15 on the opposite side of the seam.

The result of this manner of side seam formation is a substantially gas-impervious, reduced thickness seal interface extending between the two overlapped portions of the barrier layer 16 and beyond on each side of the seam 19. The advantages of this construction in resistance to product permeability and in ease and simplicity of fabrication is believed to be apparent to those skilled in the art.

It will be noted also in the side seam construction illustrated that the inner lap 17 is deformed radially inwardly, whereas the outer lap 18 conforms substantially to the normal circumference of the tube body 10. The general curvature across the arcuate distance B is only slightly less than the normal body curvature, and outer fillet 21 substantially fills the space made by deforming the inner lap. Thus, except for the very slight indentations in the outer thermoplastic layer 15 resulting from the application of sealing pressure, the outer surface of side seam 19 substantially conforms to and blends with the normal peripheral surface of the tube body to give a neat, continuous appearance, a distinct advantage in terms of aesthetic appeal over prior art constructions wherein the final side seam retains a spiral-like or discontinuous appearance somewhat similar to that represented in FIGURE 2.

In closing the collapsible tube after filling with a product, it is preferred that transverse end seal 13 be formed in a plane passing through the axis of the tube as close as possible to side seam 19. That is, the side seam 19 extends longitudinally of the body 10 along a line that is only slightly angularly displaced from the plane of end seal 13. This places the side seam substantially in what could be called the side wall portion of the tube body, thereby leaving the front and back panels of the tube completely free and unobstructed for decorative purposes.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. A collapsible container comprising a tubular body of laminated construction including a barrier layer and an inner layer of thermoplastic material substantially coextensively bonded together, said layers being overlapped a predetermined distance at their opposite circumferential margins and joined together by heat and pressure providing inner and outer lap edges of a side seam extending the full length of said body, said lapped edges having a reduced thickness of approximately 75% of the combined thickness of said layers by reason of a portion of said thermoplastic layer on said lapped edges being compressed and squeezed out from said lapped edges on the application of heat and pressure, said squeezed out portion forming fillets to each side of said seam which are pressed against the corresponding body layer contiguous said seam and enclose edges of said barrier layer in said seam.

2. A collapsible tube comprising a tubular body and a headpiece integrally united to one end thereof, said body being of laminated construction including inner and outer thermoplastic layers and an intermediate metallic barrier layer substantially coextensively bonded together, said layers being overlapped a predetermined distance at their opposite circumferential margins providing inner and outer lap edges of a side seam extending the full length of said body, said lapped edges being fused together under heat and pressure across the width of said seam to a reduced thickness substantially less than the combined thickness of said layers by reason of a portion of said thermoplastic layers on said lapped edges being compressed and squeezed out from said lapped edges thereby forming a reduced thickness, substantially leakproof union in said seam, said squeezed out portion of thermoplastic layers forming fillets to each side of said seam which enclose the edges of said barrier layer in said seam and are pressed against and fused with the corresponding thermoplastic layer contiguous each side of said seam.

3. The collapsible tube of claim 2 wherein said inner lap is radially deformed inwardly whereby said outer lap substantially coincides with the exterior surface of said body.

4. The collapsible tube of claim 2 wherein said body is closed at its end opposite said headpiece by means of a flat transverse seal uniting the body walls at this end and wherein said side seam extends longitudinally of said body along a line slightly out of the plane of said flat end seal.

References Cited by the Examiner

UNITED STATES PATENTS

| 2,152,323 | 3/1939 | Moore | 229—3 |
| 2,440,339 | 4/1948 | Langer | 229—48 |
| 2,982,457 | 5/1961 | D'Alelio | 229—3.5 |

FOREIGN PATENTS 898,642  6/1962  Great Britain.

THERON E. CONDON, *Primary Examiner.*

GEORGE E. LOWRANCE, *Examiner.*